(12) United States Patent
Ellmann et al.

(10) Patent No.: US 9,988,109 B2
(45) Date of Patent: Jun. 5, 2018

(54) CAPLESS AND UNIBEAM TRACK ROLLER MOUNTING SYSTEMS

(71) Applicant: Caterpillar Inc., Peoria, IL (US)

(72) Inventors: Thomas Ellmann, Groveland, IL (US); Roger E. Lawson, Brimfield, IL (US)

(73) Assignee: Caterpillar Inc., Deerfield, IL (US)

( * ) Notice: Subject to any disclaimer, the term of this patent is extended or adjusted under 35 U.S.C. 154(b) by 50 days.

(21) Appl. No.: 15/154,511

(22) Filed: May 13, 2016

(65) Prior Publication Data
US 2017/0327162 A1 Nov. 16, 2017

(51) Int. Cl.
| B62D 55/10 | (2006.01) |
| B62D 55/14 | (2006.01) |
| B62D 55/06 | (2006.01) |
| E02F 3/30 | (2006.01) |

(52) U.S. Cl.
CPC ............ *B62D 55/10* (2013.01); *B62D 55/06* (2013.01); *B62D 55/14* (2013.01); *E02F 3/308* (2013.01)

(58) Field of Classification Search
CPC ......... B62D 55/10; B62D 55/06; B62D 55/14
See application file for complete search history.

(56) References Cited

U.S. PATENT DOCUMENTS

| 3,700,288 A | 10/1972 | Davin et al. | |
| 4,241,956 A * | 12/1980 | Meisel, Jr. | B62D 55/0963 305/109 |
| 4,519,654 A | 5/1985 | Satzler et al. | |
| 4,582,367 A | 4/1986 | Jacquet et al. | |
| 4,834,478 A * | 5/1989 | Stevens | B62D 55/0842 180/9.5 |
| 4,836,318 A * | 6/1989 | Tonsor | B62D 55/08 180/9.5 |
| 5,018,591 A * | 5/1991 | Price | B62D 55/08 180/9.48 |
| 5,072,800 A * | 12/1991 | Price | B62D 55/08 180/9.48 |
| 5,293,948 A * | 3/1994 | Crabb | B62D 55/08 180/9.1 |
| 5,312,176 A * | 5/1994 | Crabb | B62D 55/15 180/9.1 |
| 5,622,234 A * | 4/1997 | Nagorcka | B62D 55/08 180/9.5 |
| 6,206,492 B1 * | 3/2001 | Moser | B62D 55/104 180/9.5 |
| 6,299,264 B1 * | 10/2001 | Kautsch | B62D 55/15 301/6.91 |
| 6,364,438 B1 | 4/2002 | Hasselbusch et al. | |
| 6,422,664 B1 | 7/2002 | Hasselbusch et al. | |
| 6,435,629 B1 | 8/2002 | Egle et al. | |

(Continued)

FOREIGN PATENT DOCUMENTS

| CN | 203306130 U | 11/2013 |
| JP | 2014196004 A | 10/2014 |

Primary Examiner — Tony H Winner
Assistant Examiner — Michael R Stabley
(74) *Attorney, Agent, or Firm* — Law Offices of Kurt J. Fugman LLC

(57) ABSTRACT

A track driven machine is provided comprising an undercarriage drive system that includes a track, and a motor that powers the drive system, wherein the undercarriage drive system further includes at least one of a capless track roller mounting system and a central unibeam track roller mounting system.

17 Claims, 6 Drawing Sheets

(56) References Cited

U.S. PATENT DOCUMENTS

| | | | |
|---|---|---|---|
| 6,457,786 B1 | 10/2002 | Maguire | |
| 6,783,196 B2 | 8/2004 | Maguire et al. | |
| 6,889,782 B2 * | 5/2005 | Komatsu | B60K 5/00 180/6.2 |
| 7,628,266 B2 | 12/2009 | Reist | |
| 7,874,387 B2 * | 1/2011 | Despres | B62D 55/00 180/9.21 |
| 2001/0004951 A1 * | 6/2001 | Pertusi | B62D 55/084 180/291 |
| 2015/0217816 A1 * | 8/2015 | Franck | B62D 55/104 305/142 |
| 2015/0217818 A1 * | 8/2015 | Vik | B62D 55/305 305/125 |
| 2015/0307144 A1 * | 10/2015 | Gustafson | B62D 55/10 305/120 |

* cited by examiner

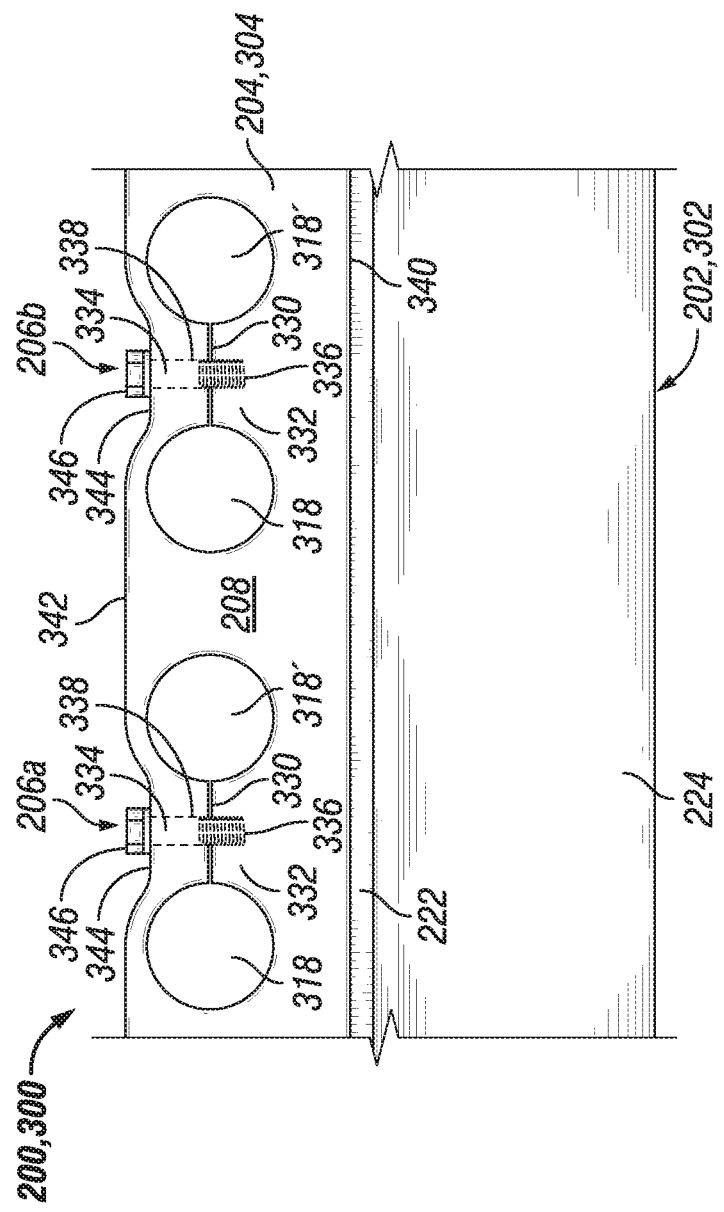

CAPLESS AND UNIBEAM TRACK ROLLER MOUNTING SYSTEMS

TECHNICAL FIELD

The present disclosure relates to track-type undercarriage systems that use rollers for supporting and guiding the track. More specifically, the present disclosure relates to track roller mounting systems that optimize load distribution from the rollers to the track, lower abrasive wear between the rollers and the shoes, provide easier cleaning and servicing of the rollers and simplify the manufacturing of the track frame.

BACKGROUND

A track-type undercarriage system utilizes track rollers, which are usually mounted in some fashion to the track frame, to support and guide the track. Generally, these track roller mounting systems fall into one of two categories. The first category is the traditional track roller mounting system, in which the rollers are mounted to the track roller frame rails at both free ends of the shaft of the rollers. That is to say, a shaft is connected to two parallel frame rails at its free ends and two roller treads are provided in-between the frame rails to engage two parallel shoe roller paths of the track. The second category is the cantilevered track roller mounting system, in which the rollers hang away from a single frame rail by a shaft whose sole free end is attached to the rail.

The traditional track roller mounting system has some disadvantages. First, the presence of two rails and caps that are typically used to mount the shaft to the rails make access to the track and rollers for cleaning difficult. This may lead to mud packing and the like over time that can cause wear on various components of the undercarriage. Second, the lack of access may make it more difficult to inspect and service various components of the undercarriage. Third, there is limited flexibility as to where and how many track rollers can be mounted to act as bottom track rollers. This may lead to a load distribution from the track to the track rollers that is less than optimal. A fourth problem is that caps and the bolted joint that hold them onto the rail, capturing the shaft of the rollers, may move or "work" over time causing wear on the components, leading to a loose bolted joint that can result in undesirable maintenance of the equipment.

The cantilevered track roller mounting system can improve on many of the advantages just described with respect to the traditional track roller mounting system. However, since the double set of rollers are only mounted at one end, the stresses resulting from the overhang on the shaft can be greater than the stresses exerted on the shaft of a traditional track roller mounting system. This results in the need to make sure that the cantilevered track roller mounting system is sufficiently robust to ensure good reliability and durability of the undercarriage.

SUMMARY OF THE DISCLOSURE

A track driven machine is provided comprising an undercarriage drive system that includes a track, and a motor that powers the drive system, wherein the undercarriage drive system further includes at least one of a capless track roller mounting system and a central unibeam track roller mounting system.

A capless track roller mounting system is provided comprising a track roller frame including a frame rail that includes capless track roller mounting structure wherein the track roller mounting structure defines a first aperture, a second aperture that is adjacent to the first aperture, a flexible retention gap that communicates between the first and second apertures and that separates the rail locally into a first part and a second part, a threaded hole in the first part of the rail that is located between the first and second apertures and that is in communication with the flexible retention gap, and a clearance hole in the second part that is in communication with the flexible retention gap and that is aligned with the threaded hole.

A central unibeam track roller mounting system is provided comprising a track roller frame including a central unibeam frame rail that includes a plurality of track roller mounting structures and that defines a first side surface and a second side surface, and a plurality of track rollers that are rotatably attached to the central unibeam frame rail and that extend from the frame rail in opposite directions wherein some of the track rollers are proximate the first side surface and the rest of the track rollers are proximate the second side surface.

BRIEF DESCRIPTION OF THE DRAWINGS

FIG. 7 is an enlarged side view of the capless and central unibeam track roller mounting system of FIG. 5.

DETAILED DESCRIPTION

Figure 1:
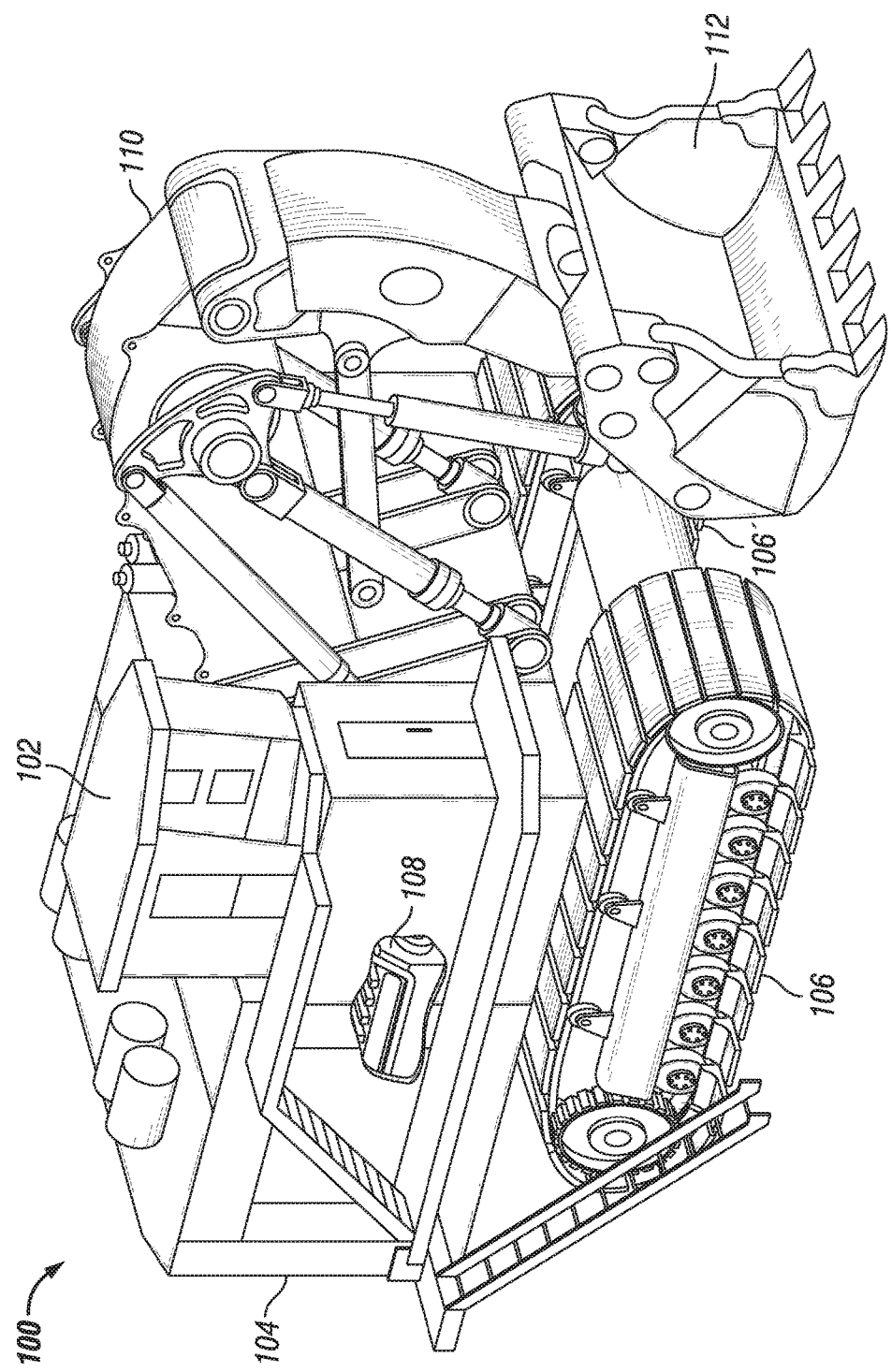
FIG. 1 is a perspective view of a machine that may use various embodiments of a capless and/or central unibeam track roller mounting system of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a capless track roller mounting system and/or a central unibeam track roller mounting system may be provided on a track driven machine as will be described momentarily.

Looking at FIG. 1, a track driven machine 100 in the form of a hydraulic mining machine is depicted. The machine 100 includes a cab 102 where the operator controls the machine 100, a turntable 104, two undercarriage drive systems 106 mounted beneath the turntable 104, a motor 108 that powers the undercarriage drive systems 106 as well as other machine systems, and an articulated boom and stick linkage assembly 110 that moves a work implement such as a bucket 112. The undercarriage drive assembly 106 on one or both sides may include various embodiments of a capless track roller mounting system and/or a central unibeam track roller mounting system as will now be described. It is contemplated that any track driven machine including smaller track driven machines may use any of the embodiments discussed herein.

Figure 2:
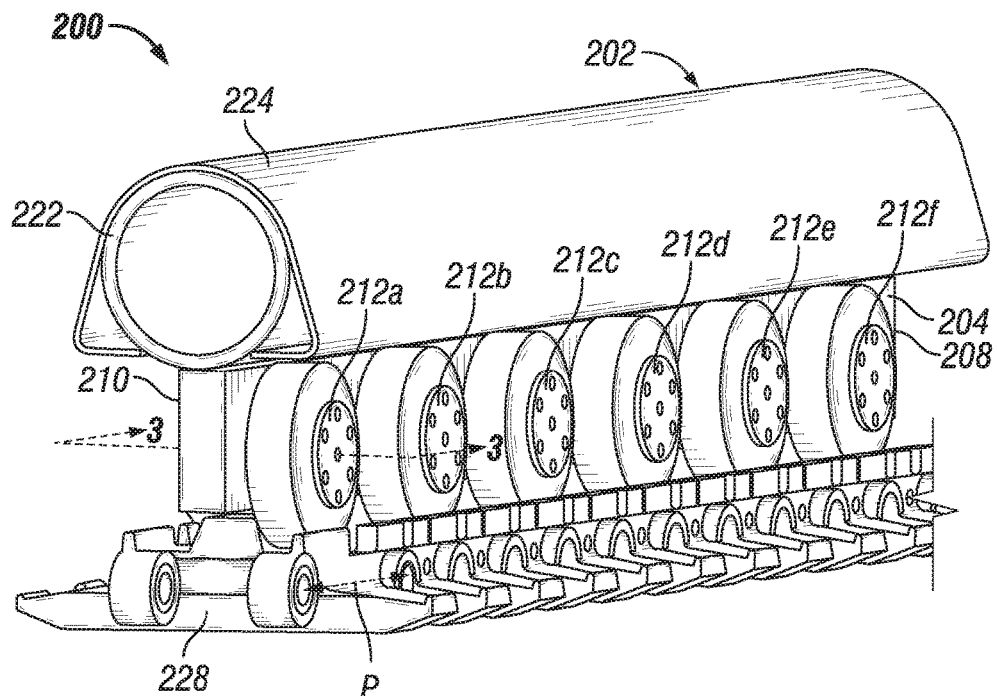
FIG. 2 is a top oriented perspective view of a capless and central unibeam track roller mounting system according to one embodiment of the present disclosure shown in isolation from a machine.

FIG. 2 illustrates a central unibeam track roller mounting system 200. The system comprises a track roller frame 202 including a central unibeam frame rail 204 that includes a plurality of track roller mounting structures 206 (best seen in FIG. 5) and that defines a first side surface 208 and a second side surface 210 (best seen in FIG. 3). A plurality of track rollers 212 are also provided that are rotatably attached to the central unibeam frame rail 204 and that extend from the frame rail 204 in opposite directions (best seen in FIGS. 3 and 4) wherein some of the track rollers 212 are proximate the first side surface 208 and the rest of the track rollers 212 are proximate the second side surface 210. As can be seen in FIG. 4, the track rollers 212 are mounted to the frame rail 204 in a staggered and alternating pattern 214 from one side surface 208 of the frame rail 204 to the other side surface 210 of the frame rail 204.

Figure 3:
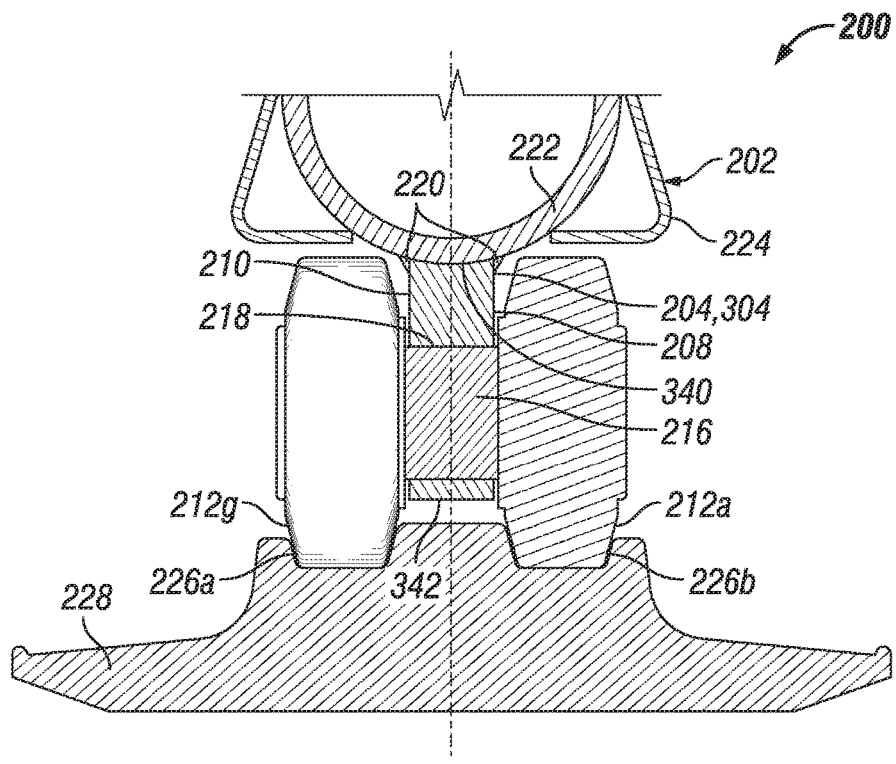
FIG. 3 is a cross-sectional view of the track roller mounting system of FIG. 2 taken along lines 3-3 thereof.
Figure 4:
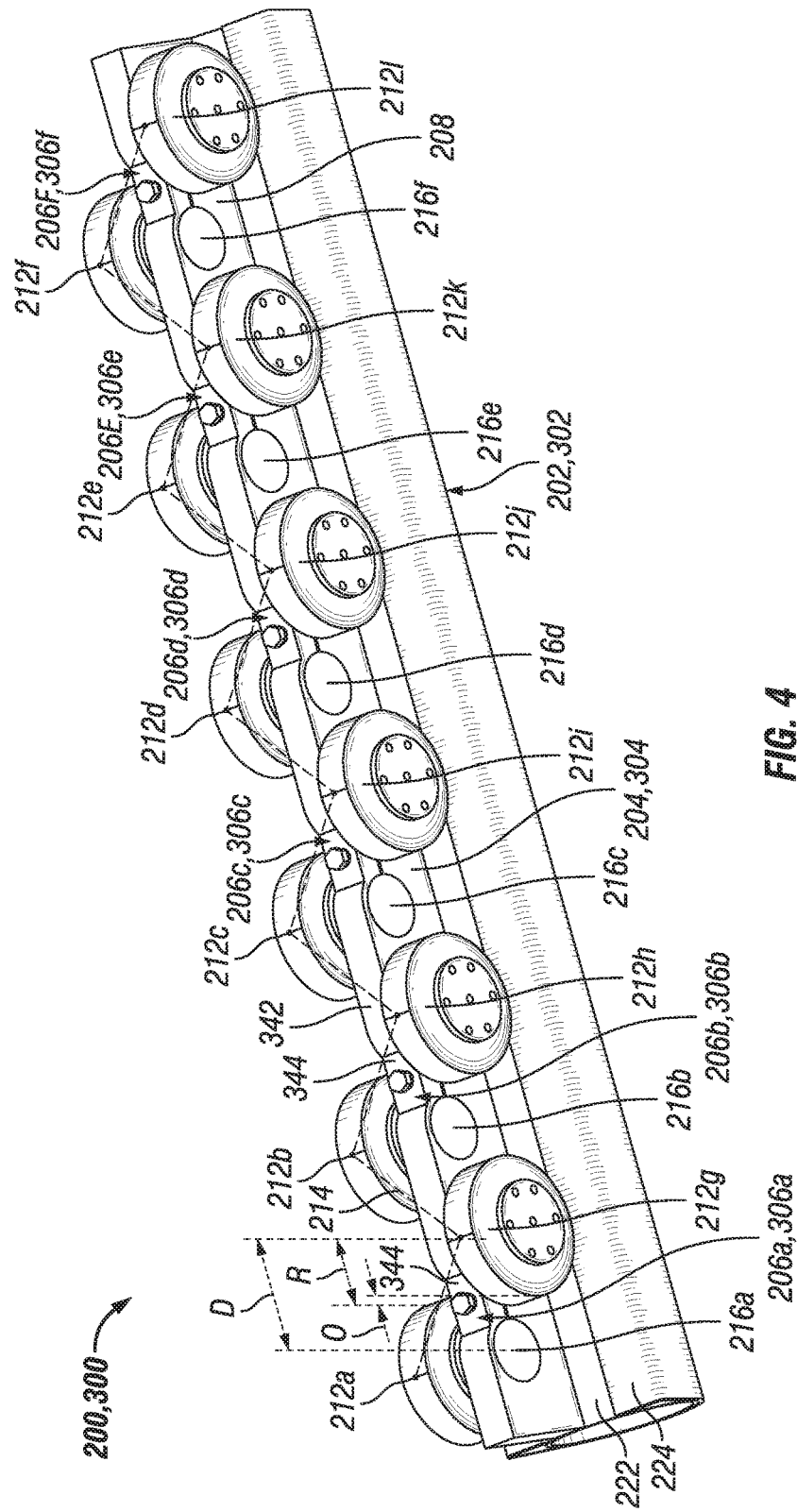
FIG. 4 is a bottom oriented perspective view of the capless and central unibeam track roller mounting system of FIG. 2.

FIG. 3 shows that the shaft 216 of a track roller assembly 212 extends into an aperture 218 of the rail frame 204. It also shows that the rail frame 204 may be welded via fillet welds 220 to the recoil housing tube 222. As depicted in FIGS. 2 and 3, a debris shield 224 may then be welded to the recoil housing tube 222 that overhangs the track rollers 212. Two sets of rollers 212 on each side of the central unibeam frame rail 204 are provided that engage two shoe roller paths 226 of the track 228.

Focusing on FIG. 4, each of the track rollers 212 are similarly circularly configured defining a radial dimension R and the plurality of track roller mounting structures 206 are similarly distanced one from another defining a centerline to centerline distance D from one track roller to an adjacent track roller. The radial dimension R is greater than half of the centerline to centerline distance D from a track roller 212 to an adjacent track roller 212. This creates an overlap O from one track roller to the next, resulting in better support of the track 228 (shown in FIGS. 2 and 3) as gaps between the areas of the track that receive roller support are reduced.

However, it is contemplated that these dimensions may be varied as needed or desired. For example, an overlap may not be present in other embodiments. In more general terms, each of the track rollers 212 may be strategically located along a linear axis of the unibeam frame rail 204. The plurality of track roller mounting structures may be similarly distanced one from another as defined by a centerline to centerline distance D from one track roller 212 to an adjacent track roller 212. This centerline distance D between track rollers 212 is preferably equal to or less than the distance of the pin center of one track joint to the pin center of an adjacent track joint (shown as P in FIG. 2) of the track 228.

For the embodiments shown in FIGS. 2 thru 7, all of the plurality of track roller mounting structures 206 are capless. However, it is contemplated that other embodiments may use caps and the like for mounting the track rollers. Other mounting structures that are known or that will be devised in the art may also be used. In the embodiments shown in FIGS. 2 thru 7, the central unibeam track roller mounting system 200 includes a track roller frame 202 that includes a recoil housing tube 222 and a debris shield 224. The recoil housing tube 222 is designed to provide strength and house the idler recoil mechanism along the longitudinal axis of the frame rail 204 while the debris shield 224 is intended to overhang the track rollers 212, protecting them from damage and mud packing and the like. It is contemplated that the debris shield and/or the recoil housing may be omitted for other embodiments.

Figure 5:
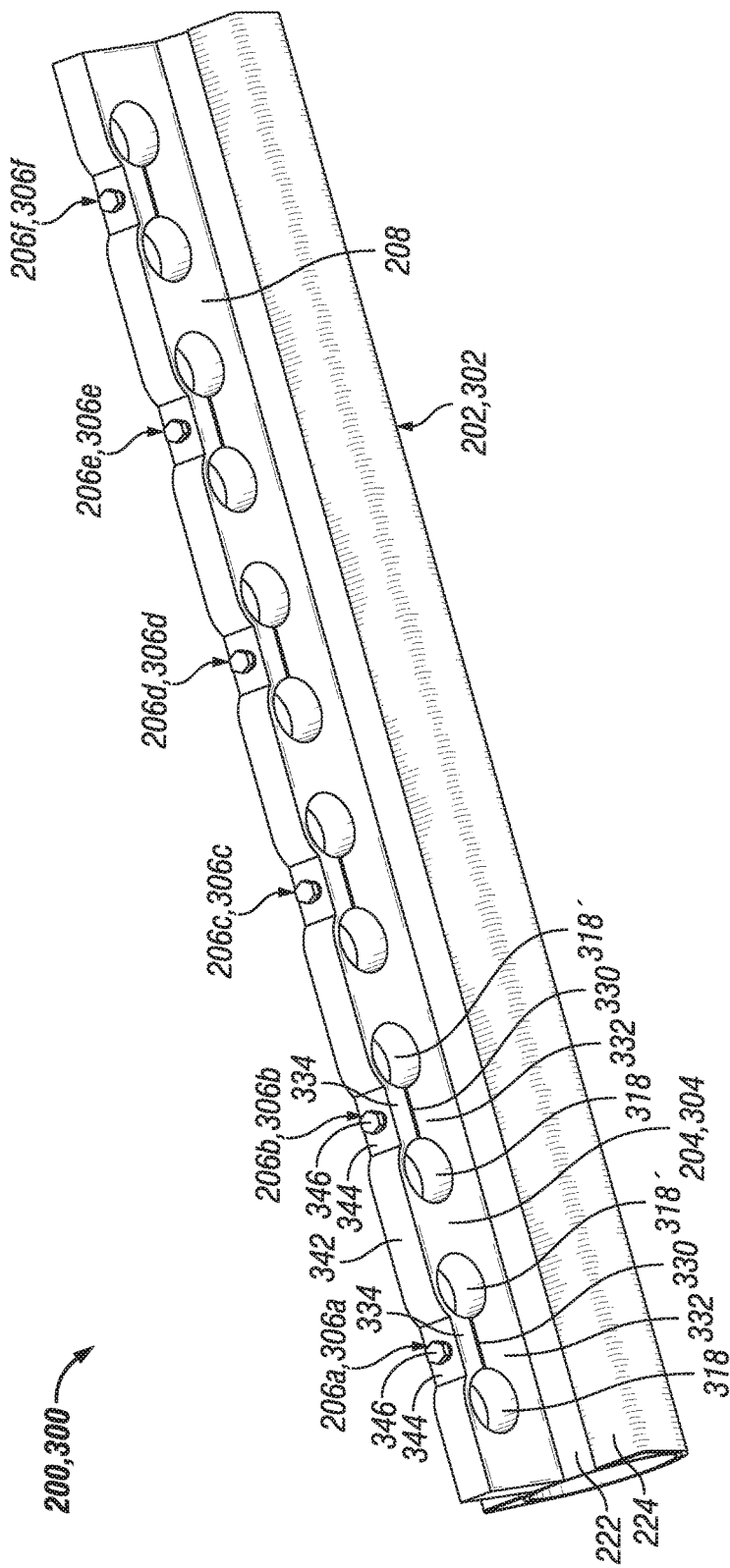
FIG. 5 is a bottom oriented perspective view of the capless and central unibeam track roller mounting system of FIG. 4 with the track rollers removed showing the capless retention mechanism more clearly.
Figure 6:
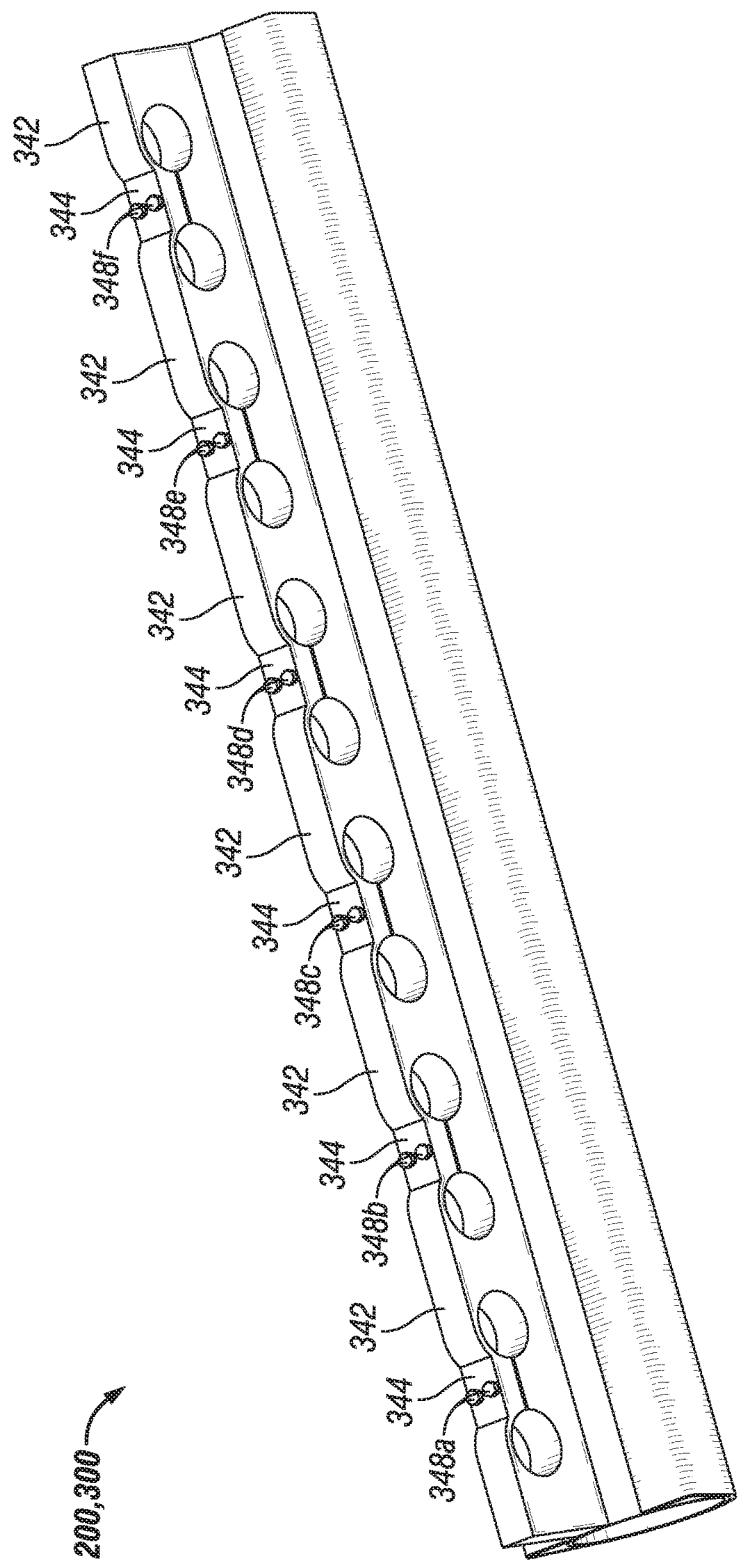
FIG. 6 is an alternate configuration of FIG. 5 showing a two bolt per joint, capless retention mechanism.

As best seen in FIGS. 4 thru 7, a capless track roller mounting system 300 may be provided that comprises a track roller frame 302 including a frame rail 304 that includes capless track roller mounting structure 306. As seen in FIGS. 5 thru 7, the track roller mounting structure 306 may define a first aperture 318, a second aperture 318' that is adjacent the first aperture 318, and a flexible retention gap 330 that communicates between the first and second apertures and that separates the rail 304 locally into a first part 332 and a second part 334. As best seen in FIG. 7, the capless track roller mounting structure 306 may further define a threaded hole 336 in the first part 332 of the rail 304 that is located between the first and second apertures 318, 318', and that is in communication with the flexible retention gap 330, and a clearance hole 338 in the second part 334 that is in communication with the flexible retention gap 330 and that is aligned with the threaded hole 336.

As shown in FIGS. 2 thru 7, the frame rail 304 is a central unibeam frame rail 204. The central unibeam frame rail is so called as it is located between the track rollers 212 and is the only frame rail provided. As best seen in FIG. 3, the frame rail 204, 304 may define an attachment surface 340, first and second side surfaces 208, 210, and a free surface 342 that defines a recess 344 (see FIGS. 5 and 6) that is in communication with the clearance hole 338. FIGS. 5 thru 7, illustrate that the recess 344 may extend completely from the first side surface 208 to the second side surface 210. Alternatively, a blind counterbore may be provided. As shown, a fastener 346 such as a cap screw or bolt is provided (along with a washer) that has a head that impinges on the washer, which in turn, impinges on the top surface 342 of the frame rail 204, 304. FIG. 5 illustrates a one cap screw or bolt arrangement for each joint while FIG. 6 illustrates a two cap screw or bolt arrangement 348 for each joint. The number of fasteners used may be varied as needed or desired. Tightening the fastener causes the flexible retention gap 330 to collapse and the second part 334 of the frame rail 204, 304 to approach the first part 332 of the frame rail 204, 304 as the fastener 346 is tightened. This in turn causes the first and second apertures 318, 318' to tighten and clamp or impinge upon the shaft 216 of the track rollers 212 as shown in FIG. 4, holding them in place and stationary.

Referring back to FIG. 1, a plurality of similarly configured track roller mounting structures 206, 306 may be provided, one on each side of the machine.

It is contemplated that any cantilevered track roller assembly that is known or that will be devised in the art may be used in conjunction with any of embodiments discussed herein. Accordingly, a detailed description of the construction of the cantilevered track roller assemblies including the shaft, seals, lubricating system, bearings, etc. is not warranted but it is to be understood that they are present in many embodiments of the present disclosure.

INDUSTRIAL APPLICABILITY

In practice, a machine may be sold or retrofitted with any of the embodiments of a capless track roller mounting system and/or a central unibeam track roller mounting system as described herein.

The various embodiments of the apparatus described herein may be manufactured as will now be described. The tubular structure of the recoil housing tube may be made using tubular stock that is cut to length. Similarly, the central unibeam frame rail may be made by purchasing or manufacturing beam stock and then cutting it to the length. The apertures, flexible retention gap and recesses may then be machined and/or plasma cut into the beam stock. Alternatively, the central unibeam frame rail may be forged, cast, etc. The debris shield may be manufactured from sheet steel using a pressing or forming process.

While most embodiments have been directed to tracks that include at least two shoe roller paths, it is contemplated that other embodiments that use a different number of shoe roller paths are within the scope of the present disclosure.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A track driven machine comprising:
   an undercarriage drive system that includes a track and a frame rail, the frame rail including a plurality of capless track roller mounting structures wherein each track roller mounting structure defines:
   a first aperture;
   a second aperture that is adjacent the first aperture;
   a flexible retention gap that communicates between the first and second apertures and that separates the rail locally into a first part and a second part;
   a threaded hole in the first part of the rail that is located between the first and second apertures and that is in communication with the flexible retention gap; and
   a clearance hole in the second part that is in communication with the flexible retention gap and that is aligned with the threaded hole; and
   a motor that powers the drive system;
   wherein the undercarriage drive system further includes at least one of a capless track roller mounting system and a central unibeam track roller mounting system.

2. The track driven machine of claim 1 wherein the undercarriage drive system includes a track roller frame including:
   a central unibeam frame rail that includes a plurality of track roller mounting structures and that defines a first side surface and a second side surface; and
   a plurality of track rollers that are rotatably attached to the central unibeam frame rail and that extend from the frame rail in opposite directions wherein some of the track rollers are proximate the first side surface and the rest of the track rollers are proximate the second side surface.

3. The track driven machine of claim 2 wherein the track rollers are mounted to the frame rail in a staggered and alternating pattern from one side surface of the frame rail to the other side surface of the frame rail.

4. The track driven machine of claim 3 wherein each of the track rollers are similarly circularly configured defining a radial dimension and the plurality of track roller mounting structures are similarly distanced one from another defining a centerline to centerline distance of one track roller to an adjacent track roller, and wherein the radial dimension is greater than half of the centerline to centerline distance from track roller to an adjacent track roller.

5. The track driven machine of claim 2 wherein the track roller frame includes a recoil housing tube and a debris shield.

6. The track driven machine of claim 2 further comprising a plurality of similarly configured frame rails, one on each side of the machine.

7. The track driven machine of claim 1 wherein the frame rail defines an attachment surface, first and second side surfaces, and a free surface that defines a recess that is in communication with the clearance hole.

8. The track driven machine of claim 7, wherein the recess extends completely from the first side surface to the second side surface.

9. The track driven machine of claim 1 further comprising a plurality of similarly configured frame rails, one on each side of the machine.

10. A capless track roller mounting system comprising:
a track roller frame including:
  a frame rail that includes capless track roller mounting structure wherein the track roller mounting structure defines:
    a first aperture;
    a second aperture that is adjacent the first aperture;
    a flexible retention gap that communicates between the first and second apertures and that separates the rail locally into a first part and a second part;
    a threaded hole in the first part of the rail that is located between the first and second apertures and that is in communication with the flexible retention gap; and
    a clearance hole in the second part that is in communication with the flexible retention gap and that is aligned with the threaded hole.

11. The capless track roller mounting system of claim 10 wherein the frame rail is a central unibeam frame rail.

12. The capless track roller mounting system of claim 10 wherein the frame rail defines an attachment surface, first and second side surfaces, and a free surface that defines a recess that is in communication with the clearance hole.

13. The capless track roller mounting system of claim 12 wherein the recess extends completely from the first side surface to the second side surface.

14. The capless track roller mounting system of claim 10 wherein the frame rail includes a plurality of similarly configured track roller mounting structures.

15. A central unibeam track roller mounting system comprising:
a track roller frame including:
  a central unibeam frame rail that includes a plurality of track roller mounting structures and that defines a first side surface and a second side surface; and
  a plurality of track rollers that are rotatably attached to the central unibeam frame rail and that extend from the frame rail in opposite directions wherein some of the track rollers are proximate the first side surface and the rest of the track rollers are proximate the second side surface,
  wherein the track rollers are mounted to the frame rail in a staggered and alternating pattern from one side surface of the frame rail to the other side surface of the frame rail, and
  further wherein each of the track rollers are similarly circularly configured defining a radial dimension and the plurality of track roller mounting structures are similarly distanced one from another defining a centerline to centerline distance of one track roller to an adjacent track roller, and wherein the radial dimension is greater than half of the centerline to centerline distance from a track roller to an adjacent track roller.

16. The central unibeam track roller mounting system of claim 15 wherein all of the plurality of track roller mounting structures are capless.

17. The central unibeam track roller mounting system of claim 15, wherein the track roller frame includes a recoil housing tube and a debris shield.

* * * * *